US012614048B2

(12) United States Patent
Shigeta

(10) Patent No.: US 12,614,048 B2
(45) Date of Patent: Apr. 28, 2026

(54) GAME TOKEN AND METHOD FOR MANUFACTURING THE SAME

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 331 days.

(21) Appl. No.: 17/797,278

(22) PCT Filed: Feb. 4, 2021

(86) PCT No.: PCT/JP2021/004072
§ 371 (c)(1),
(2) Date: Aug. 3, 2022

(87) PCT Pub. No.: WO2021/161885
PCT Pub. Date: Aug. 19, 2021

(65) Prior Publication Data
US 2023/0059812 A1 Feb. 23, 2023

(30) Foreign Application Priority Data

Feb. 14, 2020 (JP) ................................. 2020-023346

(51) Int. Cl.
*G06K 19/04* (2006.01)
*B32B 7/12* (2006.01)
(Continued)

(52) U.S. Cl.
CPC .............. *G06K 19/047* (2013.01); *B32B 7/12* (2013.01); *G06K 19/022* (2013.01);
(Continued)

(58) Field of Classification Search
None
See application file for complete search history.

(56) References Cited

U.S. PATENT DOCUMENTS 6,296,190 B1 * 10/2001 Rendleman .......... G06K 19/041
235/487
6,659,875 B2 * 12/2003 Purton ................. G06K 19/047
463/47
(Continued)

FOREIGN PATENT DOCUMENTS

JP 2002007991 A 1/2002
JP 2002312745 A 10/2002
(Continued)

OTHER PUBLICATIONS

Japanese Office Action dated Dec. 17, 2024 issued in JP Application 2023-194472.
(Continued)

*Primary Examiner* — Sunit Pandya
(74) *Attorney, Agent, or Firm* — NORTON ROSE FULBRIGHT US LLP

(57) ABSTRACT

A game token by which a plurality of RFID tags embedded in a plurality of the game tokens stacked each other can be read in a relatively stable manner is provided. A game token is provided with a security part and a receiving part that receives the security part. The security part has a shape with a diameter smaller than the diameter of the receiving part, a structure with a plurality of plastic layers laminated together, an RFID tag, and a visible print layer indicating a type or ID of the game token. The receiving part has a surface The surface of the receiving part has a recessed portion for receiving the security part, and the depth of the recessed portion is 25% or more of the thickness of the game token.

10 Claims, 11 Drawing Sheets

(51) Int. Cl.
  *G06K 19/02*      (2006.01)
  *G07F 17/32*      (2006.01)

(52) U.S. Cl.
  CPC ...... *G07F 17/3216* (2013.01); *G07F 17/3241* (2013.01); *B32B 2307/4023* (2013.01); *B32B 2307/72* (2013.01); *B32B 2429/00* (2013.01)

(56)           References Cited

U.S. PATENT DOCUMENTS

| | | | | |
|---|---|---|---|---|
| 7,866,563 | B2 * | 1/2011 | Chapet | G06K 19/07724 235/492 |
| 7,931,204 | B2 | 4/2011 | Chapet | |
| 7,942,334 | B2 * | 5/2011 | Charlier | G07F 17/32 235/487 |
| 11,790,202 | B2 * | 10/2023 | Shigeta | G06K 19/022 235/487 |
| 2005/0059479 | A1 | 3/2005 | Soltys et al. | |
| 2007/0278314 | A1 | 12/2007 | Chapet | |
| 2010/0006654 | A1 | 1/2010 | Poel | |
| 2010/0105486 | A1 | 4/2010 | Shigeta | |
| 2010/0130288 | A1 | 5/2010 | Shigeta | |
| 2011/0018715 | A1 * | 1/2011 | Lee | G06K 19/047 340/572.7 |
| 2012/0080527 | A1 * | 4/2012 | Finn | H01P 11/001 235/492 |
| 2013/0099445 | A1 * | 4/2013 | Wright | A63F 3/00697 273/148 R |
| 2014/0332597 | A1 * | 11/2014 | Gelinotte | G06K 19/047 29/601 |
| 2018/0068525 | A1 | 3/2018 | Shigeta | |
| 2019/0034771 | A1 * | 1/2019 | Shigeta | B32B 27/08 |
| 2020/0272873 | A1 * | 8/2020 | Shigeta | B32B 3/08 |

FOREIGN PATENT DOCUMENTS

| | | | |
|---|---|---|---|
| JP | 2006163784 | A | 6/2006 |
| JP | 2008250847 | A | 10/2008 |
| JP | 2009110144 | A | 5/2009 |
| JP | 2009176002 | A | 8/2009 |
| JP | 2019025321 | A | 2/2019 |
| KR | 1020050011592 | A | 1/2005 |
| KR | 100947217 | B1 | 3/2010 |

OTHER PUBLICATIONS

Japanese Office Action dated Jun. 27, 2023 issued in JP Application 2022-149044.

US Office Action dated Dec. 19, 2022 issued in U.S. Appl. No. 17/172,758.

International Search Report dated Apr. 20, 2021 issued in PCT Application PCT/JP2021/004072.

US Office Action dated Dec. 21, 2021 issued in U.S. Appl. No. 17/172,758.

Australian Office Action dated Jan. 17, 2022 issued in AU Application 2021200797.

Japanese Office Action dated Feb. 22, 2022 issued in JP Application 2021-009378.

Australian Examination Report No. 2 dated Jun. 6, 2022 issued in AU Application 2021200797.

US Office Action dated Jun. 24, 2022 issued in U.S. Appl. No. 17/172,758.

Japanese Office Action dated Jun. 17, 2025, issued in JP Application No. 2022-500353.

US Office Action dated Sep. 30, 2025, issued in U.S. Appl. No. 19/068,528.

Australian Examination Report No. 1 dated Feb. 6, 2026 issued in AU Application No. 2024227313.

\* cited by examiner

GAME TOKEN AND METHOD FOR MANUFACTURING THE SAME

CROSS-REFERENCE OF RELATED APPLICATIONS

This application is a national phase application under 35 U.S.C. § 371 of International Application No. PCT/JP2021/004072 filed Feb. 4, 2021, which claims the benefit of JP Application No. 2020-023346 filed in Japan on Feb. 14, 2020, the contents of each disclosure are hereby incorporated by reference.

TECHNICAL FIELD

The present invention relates to a game token with a security part and a receiving part that accepts the security part, and a method for manufacturing the same.

BACKGROUND ART

In the past, a game token, such as gaming chips and plaques, have been used in amusement facilities as a substitute for coins. A game token has a plate shape with two parallel planes (surfaces), and its outline is, for example, circular or rectangular. A type of game token with a central part embedded in the center of the surface is known. It can give a sense of luxury to the appearance of the game token by differentiating the material of the central part from that of the outer receiving part (e.g., the central part is made of ceramic and the receiving part is made of resin).

As a game token with such a central part, it is also known a game token with a built-in RFID tag in which a security element such as an RFID tag is provided on the inner surface of the central part, and the central part is fixed to the receiving part (see, for example, U.S. Pat. No. 6,659,875).

FIG. 9 shows a schematic cross-sectional view of a conventional game token with a built-in RFID tag. The game token 500 has a receiving part 510 formed by molding resin. A recessed portion is formed in the center of both surfaces of the receiving part 510. The central parts 520 and 530 are fitted into the recessed portions, respectively. The bottom of the recessed portion and the central parts 520 and 530 are glued to each other with adhesive.

The RFID tag 550 is placed in the recessed portion on one side (the upper side in the example of FIG. 9) and is sandwiched between the bottom of the recessed portion and the central part 521 to be built into the game token 500. The RFID tag 550 records information that uniquely identifies the game token 500 (identification information), information on the manufacture of the game token 500 (manufacturing date, manufacturing plant, manufacturing line) and other information.

Information stored in such a RFID tag 550 is read by using an RFID reader in amusement facilities. As is well known, the RFID reader communicates with an RFID tag in a non-contact manner by generating electromagnetic waves from an antenna, and reads the information stored in the RFID tag. In addition to reading the information stored in the RFID tag, the RFID reader/writer can also write information to the writable area of the RFID tag.

The information stored in the RFID tag can be used to ensure the security of the game token 500, i.e., to detect counterfeit game token that do not have an RFID tag that stores the appropriate information. For this reason, the RFID tag 550 and the central part 521 for holding the RFID tag 500 inside the game token 500 so that it cannot be removed are collectively referred to as the security part 520.

SUMMARY OF INVENTION

Technical Problem

In an amusement facility, it may be necessary for using an RFID reader that reads a plurality of RFID tags embedded in a plurality of stacked game token at once. For example, when game token are stored in a chip tray, they are stacked in the thickness direction, so when the RFID reader reads the RFID tags of the game token in the chip tray, it is necessary to read the RFID tags of the multiple stacked game tokens at the same time. In this case, the RFID tags of the stacked game tokens need to be read at the same time. Further, when betting game tokens at a table, multiple game tokens are usually stacked on top of each other, and the RFID reader needs to read the RFID tags of the stacked game tokens at the same time.

FIG. 10 shows a schematic diagram of a stack of conventional game tokens with built-in RFID tags. As shown in FIG. 10, if the security part 520 is provided on one surface side of the game token 500, when such game token 500 are stacked in any direction, the distance between the plural RFID tags 550 embedded in two adjacent game token 500 is no longer uniform, and the difference in the distances becomes relatively large. This makes the reading or writing of the RFID tags 550 by electromagnetic waves unstable.

When stacking RFID tags, the distance between adjacent RFID tags can be made uniform by adopting an appearance design in which the surface on which the security part 520 is embedded is distinguishable from the surface on the opposite side, and stacking the game tokens so that they are facing the same direction while checking the front and back. However, it is clear that such an operation is cumbersome.

On the other hand, a conventional gaming chip with the configuration shown in FIG. 11 is also known. In this gaming chip 500', a capsule 551 having a built-in RFID tag 550 is used as a security part 552, a receiving part 510 is provided around the capsule 551, and a step is provided between the receiving part 510 and the capsule 551 to form indents. Then, by attaching the central parts 520 and 530 to the indents, the gaming chip 500' is completed.

According to such a gaming chip 500', there is little bias of the RFID tag 550 when the gaming chips 500' are stacked as described above, and there is no instability in reading or writing. However, such a gaming chip 500' requires an RFID tag 550 to be housed inside the capsule 551, which is a costly process and does not produce a high yield.

Therefore, one of the objects of the present invention is to provide a game token that incorporates an RFID tag by means of a security part, in which a plurality of RFID tags embedded in a plurality of stacked game tokens can be read in a relatively stable manner even when the plurality of game tokens are stacked in any direction.

Another object of the present invention is to provide a game token that can ensure security at a low cost.

Solution to Problem

A game token in one aspect of the present invention is a game token comprising a security part and a receiving part that accepts the security part, wherein the security part has: a shape with a diameter smaller than the diameter of the receiving part; a structure consisting of a plurality of laminated plastic layers, an RFID tag; and a visible print layer indicating the type or ID of the game token, wherein the receiving part has a recessed portion on its surface to accept at least one of the security part, wherein the depth of the recessed portion is at least 25% of the thickness of the game token.

With this configuration, since the depth of the recessed portion for accepting the security part in the receiving part is 25% or more of the thickness of the game token, the RFID tag can be placed closer to the center of the game token in the thickness direction compared to the conventional game token. Therefore, even when a plurality of game tokens are stacked in any direction, the difference in distance between the RFID tags can be made relatively small, and the reading of the RFID tags can be stabilized.

The RFID tags may be positioned less than 25% above and below the center of the thickness direction of the game token.

With this configuration, even when a plurality of game tokens are stacked in any orientation, the difference in distance between the RFID tags becomes relatively small, and the reading of the RFID tags becomes stable.

The RFID tags may be disposed between the plurality of plastic layers.

With this configuration, even if the security part is removed from the receiving part, the RFID tag cannot be easily removed, thus improving security.

The RFID tag may be provided on the inner surface of the security part.

This configuration facilitates manufacturing.

The RFID tag may store information related to the type or ID of the game token represented in the visible print layer.

With this configuration, the type or ID of the game token can be identified by reading the RFID tag.

The RFID tag may store information associated with the appearance of the receiving parts.

With this configuration, information related to the appearance can be obtained by reading the RFID tag.

The security part may comprise a thermo-compression bonded plastic layer.

This configuration enables a structure in which a plurality of plastic layers are laminated by the method of thermo-compression.

The security part may be composed of the plastic layer bonded with an adhesive.

This configuration enables a structure in which a plurality of plastic layers are laminated by way of adhesive bonding.

A game token in another aspect of the present invention is a game token comprising: a receiving part having a first recessed portion of a first depth on one side and a second recessed portion of a second depth deeper than the first depth on the other side; a first part to be fitted into the first recessed portion; a second part to be fitted into the second recessed portion; and an RFID tag placed at a position deeper than the first depth in the second recessed portion.

With this configuration, the RFID tag is positioned closer to the center of the thickness direction of the game token. As a result, even when a plurality of game tokens are stacked in an arbitrary orientation, the difference in distance between the RFID tags becomes relatively small, stabilizing the reading of the RFID tags.

The specific gravity of the second part may be greater than that of the first part.

With this configuration, the weight of the game token can be adjusted to balance in the thickness direction.

The specific gravity of the second part may be less than the specific gravity of the receiving part.

With this configuration, the weight of the game token can be adjusted to balance in the thickness direction.

The receiving parts may a weighted member inside, and said weighted member has a higher specific gravity than a member other than the weighted member that comprises said receiving parts.

With this configuration, the weight of the game token can be adjusted, and the weight in the thickness direction can be balanced according to the position of the weight member.

The weight member may be disposed at a position deviating from the center in the thickness direction of the game token and/or has an asymmetrical shape in the thickness direction of the game token, thereby reducing the weight imbalance caused by the security parts.

With this configuration, the weight of the game token can be balanced in the thickness direction using the weight member.

A game token in another aspect of the present invention is a game token comprising: a receiving part having a recessed portion on at least one side; and a security part having an RFID tag, wherein the security part is inserted into the recessed portion, wherein the depth of the recessed portion is 25% or more of the thickness of the receiving part, and wherein the RFID tag is positioned less than 25% above and below the center of the thickness direction of the game token.

With this configuration, the RFID tag can be disposed at a position less than 25% above and below the center of the thickness direction of the receiving part, so that even when a plurality of game tokens are stacked in any direction, the difference in distance between the RFID tags can be made relatively small, thereby stabilizing the reading of the RFID tag.

A game token in another aspect of the present invention is a game token comprising: a receiving part having a recessed portion on at least one side, and a security part that is inserted into the recessed portion, wherein the security part has a laminated structure including a plurality of plastic layers, and RFID tags are embedded between the plastic layers.

With this configuration, a game token with a built-in RFID tag can be configured simply by attaching the security part having a laminated structure to the recessed portion of the receiving part.

A method in one aspect of the present invention is a method for manufacturing a game token, comprising: manufacturing, by molding, a receiving part having a recessed portion; manufacturing a security part by integrating a plurality of plastic layers with an RFID tag between the layers; and bonding the security part to the recessed portion.

With this configuration, it is possible to configure a game token with a built-in RFID tag simply by attaching the security parts of the laminated structure to the recessed portion of the receiving part.

A method in another aspect of the present invention is a method for manufacturing a game token, comprising: manufacturing, by molding, a receiving part having a recessed portion; manufacturing a security part by integrating a plurality of plastic layers with an RFID tag between the layers; and bonding the security part to the recessed portion.

With this configuration, the security part can be easily manufactured, and a game token with a built-in RFID tag can be easily manufactured.

DESCRIPTION OF EMBODIMENTS

The following is a detailed description of the game token according to the present invention with reference to the drawings. In the following, a disc-shaped gaming chip is described as a game token in embodiments of the present invention, but the invention is not limited by the following embodiments. For example, the shape of the game token may be a rectangular plate shape or any other shape. Also, the game token may be a plaque. The components in the following embodiments include those that can be easily assumed by those skilled in the art or those that are substantially the same.

A. First Embodiment

Figure 1:
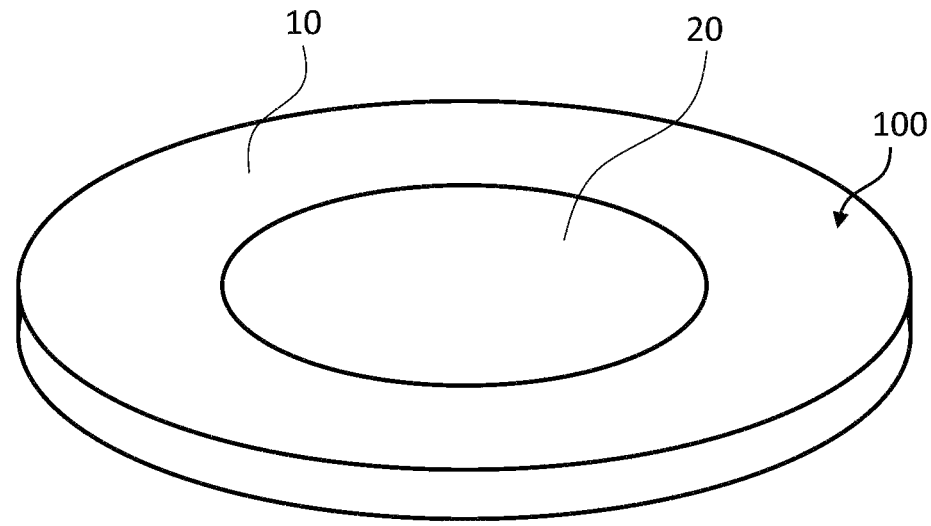
FIG. 1 shows a diagram of a game token use in accordance with the first embodiment of the present invention.

FIG. 1 is a diagram of a game token according to the first embodiment of the present invention. As shown in FIG. 1, the game token 100 is plate-shaped and has two parallel surfaces (front surface and back surface). The game token 100 has a disc shape. The game token 100 is circular in plane view and has a central parts 20 and 30 in the center of the receiving part 10 (see FIG. 2 for the central part 30). The central parts 20 and 30 are also referred to as decals.

Although not illustrated in FIG. 1, the game token 100 has one of several values or types defined, and each value or type has a different appearance. For example, the value or type may be represented by the color of the receiving parts 10. For example, a band pattern may be attached to the circumferential side surface of the receiving part 10, and the value or type may be represented by the color of the band. In addition, the surfaces of the central parts 20 and 30 are marked with numbers indicating the value. In addition, the exterior of the game token 100 may be marked with the ID (e.g., identification code, identification number) of the game token 100 in a manner that is visible under normal use or in a manner that is not visible.

In particular, as described below, the central part 20, as a component of the security part 50 together with the laminated structure 40 described below, may be marked with information regarding security. For example, an ID (e.g., identification code, identification number) for uniquely identifying the game token 100, information indicating the value or type of the game token 100, information for determining authenticity, and the like may be indicated on the central part 20 in a code format or other format. The information indicated on the central part 20 may be printed with ink that is visible when observed under visible light, or may be printed with ink that is visible when observed under special light (e.g., UV ink that is visible under ultraviolet light, infrared absorption ink that is visible under infrared light, etc.).

Figure 2:
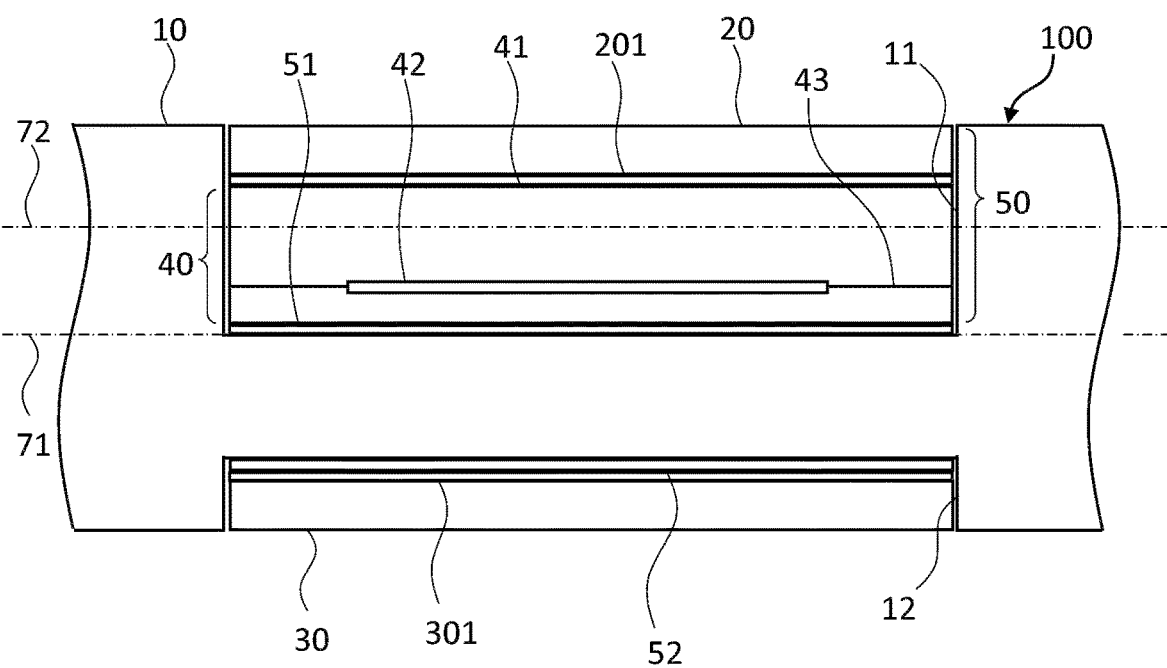
FIG. 2 shows a schematic cross-sectional view of a portion of the cross-section of a game token in accordance with the first embodiment of the present invention.

FIG. 2 is a cross-sectional view schematically showing a portion of a cross-section of a game token according to the first embodiment of the present invention. The game token 100 has an receiving part 10 and two central parts 20 and 30, which are respectively provided on both sides of the receiving part 10. The diameters of the central parts 20 and 30 are smaller than the diameter of the receiving part 10 and are enclosed by the periphery of the receiving part 10.

A laminated structure 40 is disposed inside the central part 20, and the central part 20 and the laminated structure 40 comprise a security part 50. The laminated structure 40 has a structure in which an RFID tag 42 is sandwiched between two plastic layers 41 and 43. The plastic layer 41 consists of white PETG resin (hereinafter referred to as "white PETG"), and the plastic layer 43 consists of transparent PETG resin (hereinafter referred to as "transparent PETG"). The plastic layer 41 and the plastic layer 43 are thermo-compressed with the RFID tag 42 sandwiched between them to form a laminated structure 40 that incorporates the RFID tag 42. The RFID tag 42 is embedded in the plastic layer 41 and the plastic layer 43 and is held inside by the thermo-compression bonding of the plastic layer 41 and the plastic layer 43. The plastic layer 41 may be any other color or transparent, and the plastic layer 43 may be white or any other color. The plastic layers 41 and 43 are not limited to PETG resin, but can also be A-PET or other materials.

In the center of the two surfaces (front and back) of the receiving part 10, recessed portions 11 and 12 are formed respectively, the security part 50 and the central part 30 are received in these recessed portions 11 and 12, respectively, so that the game token 100 is constructed with a flat surface with no substantial step between the receiving part 10 and the central part 20 and between the receiving part and the central part 30. The receiving part 10 is manufactured by molding resin. Alternatively, the receiving part 10 may be manufactured by layering multiple layers of plastic, or may be manufactured from clay, ceramic, metal, or other materials.

In the example of FIG. 2, a radial gap is shown between the security part 50 and the recessed portion 11 of the receiving part 10 in order to clearly distinguish between the security part 50 and the receiving part 10, in practice, however, the dimensions of the recessed portion 11 and the security part 50 are designed so that there is practically no such gap. The same applies to the gap between the central part 30 and the recessed portion 12 of the receiving part 10. In practice, the dimensional design of the recessed portion 12 and the central part 30 is done so that there is no such gap shown in FIG. 2.

The central parts 20 and 30 are printed on the surface that will be the inner side when they are received by the receiving parts 10, respectively, and this printing forms the print layers 201 and 301 made of ink. The central parts 20 and 30 are respectively transparent, and the print layers 201 and 301 are visible from the outside of the game token 100 through the transparent central parts 20 and 30.

The laminated structure 40 is glued (fixed) to the bottom of the deeper recessed portion 11 of the receiving part 10 by the glue sheet 51. The central part 20 is glued to the front side of the laminated structure 40 by glue.

The thickness of the central part 20 is 0.2 mm to 0.4 mm, and in this embodiment 0.3 mm. The thickness of the plastic layer 41 is 0.8 mm to 1.2 mm, and its specific gravity is 2.00 to 2.30. In this embodiment, the thickness is 1.0 mm and the specific gravity is 2.13. The RFID tag 42 is a printed RFID tag, and its thickness is 0.08 mm to 0.12 mm, and in this embodiment, it is 0.1 mm. The thickness of the plastic layer 43 is 0.12 mm to 0.18 mm, and in this embodiment is 0.15 mm.

In other words, in the laminated structure 40 that holds the RFID tag 43 inside, the thickness of the plastic layer 41 as an outer layer, is sufficiently greater than the thickness of the plastic layer 43 as an inner layer. This configuration allows the RFID tag 42 to be placed closer to the center of the thickness direction of the game token 100, as described below.

The combined thickness of the security part 50 and the glue sheet 51 is 1.4 mm to 1.8 mm, and in this embodiment is 1.55 mm. The specific gravity of the security part 50 is greater than that of the central part 30 and less than that of the receiving part 10.

The thickness of the glue sheet 51 is about 0.05 mm. The depth of the deep recessed portion 11 that receives the security part 50 is 1.600 to 1.800 mm, and in this embodiment it is 1.675 mm. Therefore, the surface of the security part 50, which has a total thickness of 1.55 mm, is glued to the recessed portion 11 by a 0.05 mm glue sheet 51, so that the surface of the security part 50 and the surface of the receiving part 10 are almost flat, and the surface of the security part 50 is about 0.075 mm lower than the surface of the receiving part 10.

The central part 30 is made of transparent PETG and has a print layer 301 on its upper surface (inner surface). The thickness of the central part 30 is 0.2 mm to 0.4 mm, and in this embodiment it is 0.3 mm. The central part 30 is adhered to the bottom of the recessed portion 12 of the receiving part 10 by means of a glue sheet 52 having adhesive properties on both sides. Since the central part 30 is transparent, the printing of the print layer 301 is visible from the outside of the game token 100 through the central part 30.

The thickness of the glue sheet 52 is about 0.5 mm. The depth of the shallow recessed portion 12 that receives the central part 30 is 0.45 mm. Therefore, the central part 30 with a thickness of 0.3 mm is glued to the recessed portion 12 by the glue sheet 52 with a thickness of 0.05 mm, so that the surface of the central part 30 and the surface of the receiving part 10 are almost flat, and the surface of the central part 30 is about 0.1 mm lower than the surface of the receiving part 10.

The depth of the recessed portion 11 that receives the security part 50 is preferably 25% to 65% of the thickness of the game token 100, more preferably 40% to 55%, and in this embodiment 50%.

The thickness of the game token 100 is 3.35 mm. Therefore, the recessed portion 11 of the receiving part 10 that accepts the security part 50 is half the thickness of the periphery of the receiving part 10 (i.e., the thickness of the game token), and the bottom of the recessed portion 11 is located at the center of the thickness direction of the receiving part 10. In this way, the indentation 11 is formed sufficiently deep, and the RFID tag 42 is biased toward the center of the thickness direction of the game token 100 in the security part 50 that is accepted therein. In this way, the position of the RFID tag 42 in the thickness direction of the game token 100 will be closer to the center of the thickness direction of the game token 100.

The amount of offset of the RFID tag 42 from the center of the thickness direction in the game token 100 is preferably small, specifically 0.4 mm or less, and more preferably 0.375 mm or less. In this embodiment, the offset amount is about 0.25 mm. This offset amount is preferably 0-25% of the thickness of the game token 100, more preferably 0-10%, and in this embodiment is about 7.5%. FIG. 2 shows a line 71 indicating the center of the thickness direction of the game token 100 and a line 72 indicating the position where the offset amount is 25%.

The RFID tag 42 records various information. The RFID tag 42 records fixed information such as information obtained from the appearance of the game token 100 (e.g., value or type information) and the ID (e.g., identification code, identification number, etc.) of the game token 100. The RFID tag 42 may record information related to the information (e.g., value, type, ID, etc.) represented by the print layers 201 and 301. The RFID tag 42 may have a rewritable area that can be rewritten by an RFID reader/writer. The RFID tag 42 may have a rewritable area that can be rewritten by an RFID reader/writer. In the rewritable area, variable information such as the history of the owner of the game token 100 is recorded.

When the security information is indicated on the central part 20, the security information and the information recorded on the RFID tag 42 may be associated in the database. Such a game token 100 may be inspected for ID, authenticity, and the like using an inspection device when the RFID tag 42 is read at a table or other location, or when it is inspected exclusively. The inspection device can inspect the game token 100 by reading the security information written on the central part 20 as well as reading the RFID tag 42 and matching them with a database.

Figure 3:
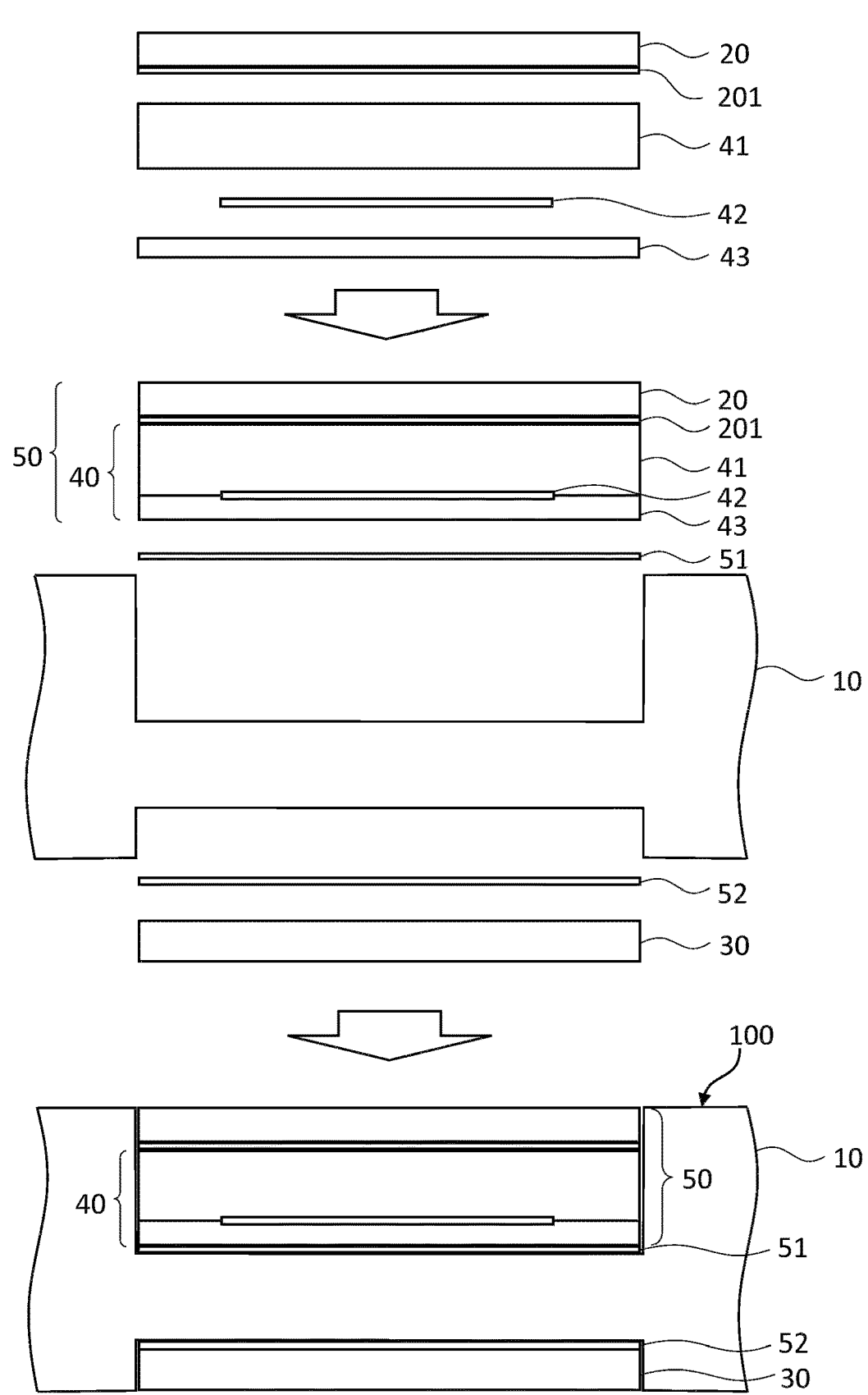
FIG. 3 shows the manufacturing process of a game token in accordance with the first embodiment of the present invention.

FIG. 3 shows the manufacturing process of a game token according to the first embodiment of the present invention. A printed RFID tag 42 is placed between a sheet of transparent PETG, which serves as the plastic layer 43 of the laminated structure 40, and a sheet of white PETG, which serves as the plastic layer 41, and they are thermo-compressed and hollowed out into a circle to form the laminated structure 40. The plastic layer 41 of the laminated structure 40 and the print layer 201 of the central part 20 are bonded with an adhesive to form the security part 50 by integrating the laminated structure 40 and the central part 20.

The receiving part 10 is manufactured by molding resin. The circular security part 50 formed as described above is glued to the bottom of the deeper recessed portion 11 of the receiving part 20 by means of a glue sheet 51 having adhesive properties on both sides.

In the same way for the central part 30, a sheet of transparent PETG is printed and hollowed out into a circular shape to form the central part 30 with a print layer 301. The circular central part 30 formed in this way is glued to the bottom of the shallow recessed portion 12 using a glue sheet 52 having adhesive properties on both sides.

Figure 4:
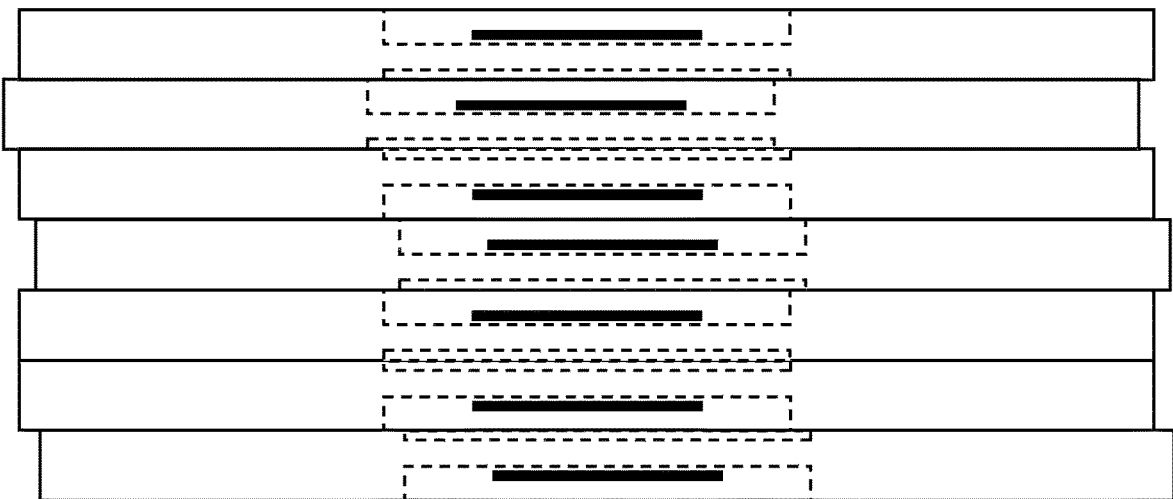
FIG. 4 shows a schematic diagram of a plurality of game token in accordance with the first embodiment of the present invention.
Figure 10:
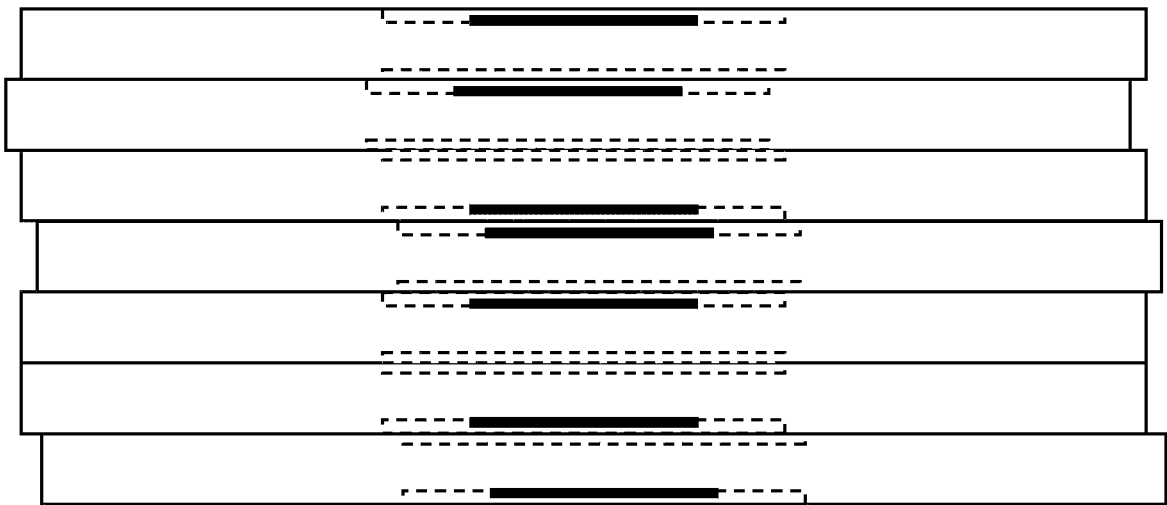
FIG. 10 shows a schematic diagram of a stack of conventional game tokens with built-in RFID tags.

FIG. 4 is a schematic diagram showing a plurality of game tokens stacked according to the first embodiment of the present invention. As described above, in this embodiment, the amount of offset of the RFID tag 42 from the center in the thickness direction of the game tokens 100 is relatively small. Therefore, as is apparent when FIG. 4 is compared with FIG. 10, the difference in distance between adjacent RFID tags 42 is relatively small even when a plurality of game tokens 100 are stacked in any orientation. This makes it possible to stabilize the reading of multiple stacked game tokens 100 even when the RFID reader reads them all at once.

Figure 9:
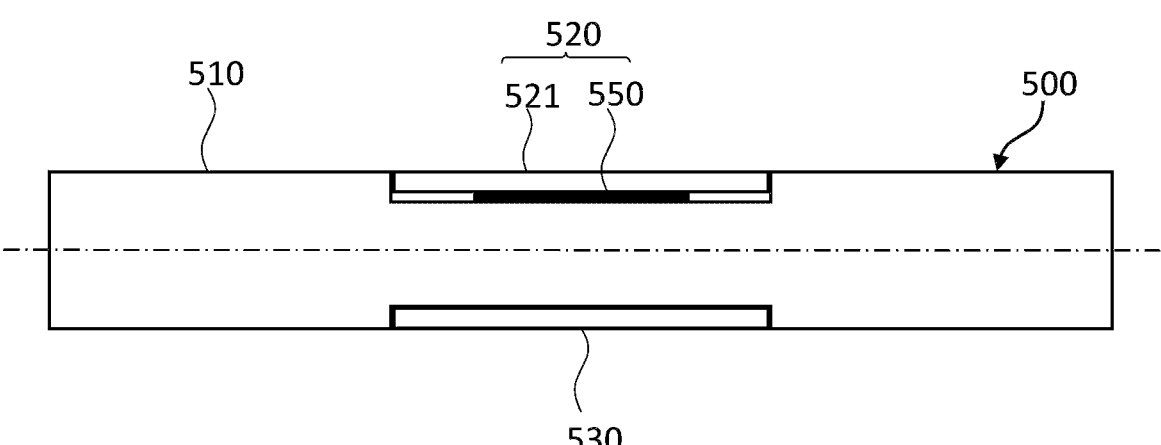
FIG. 9 shows a schematic cross-sectional view of a conventional game token with a built-in RFID tag.
Figure 11:
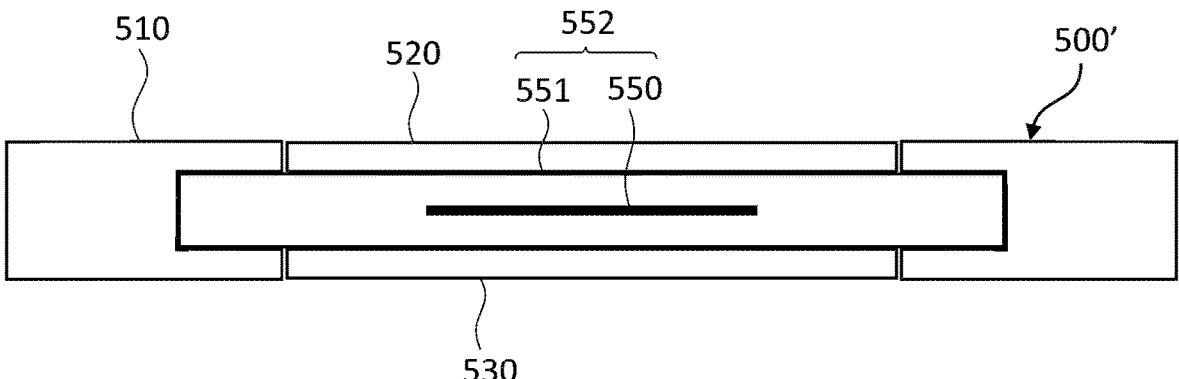
FIG. 11 shows a schematic cross-sectional view of a conventional game token with a built-in RFID tag.

According to this embodiment, instead of the concept of having the RFID tag built into the capsule as shown in FIG. 11, the configuration of having the RFID tag built into the central part is adopted, while following the configuration of fitting and gluing the central part, called a decal, into the receiving part as shown in FIG. 9. As a result, the manufacturing cost can be reduced. Furthermore, in the conventional structure shown in FIG. 9, the RFID tag is exposed by peeling off the decal, but in the game token 100 of this embodiment, the RFID tag 40 is built into the security part 15 (equivalent to the central part of the prior art shown in FIG. 9) that is installed in the recess of the receiving part 10. Therefore, even if the central part 20 or the security part 50 is peeled off, the RFID tag 42 will not be exposed, thus ensuring security.

In the above embodiment, the laminated structure 40 is configured by thermo-compression bonding a plurality of plastic layers, but alternatively, the laminated structure 40 may be configured by bonding a plurality of plastic layers with an adhesive. Also, instead of the laminated structure 40, a part holding the RFID tag 42 may be manufactured by insert molding using the RFID tag 42 as an insert part.

B. Second Embodiment

Figure 5:
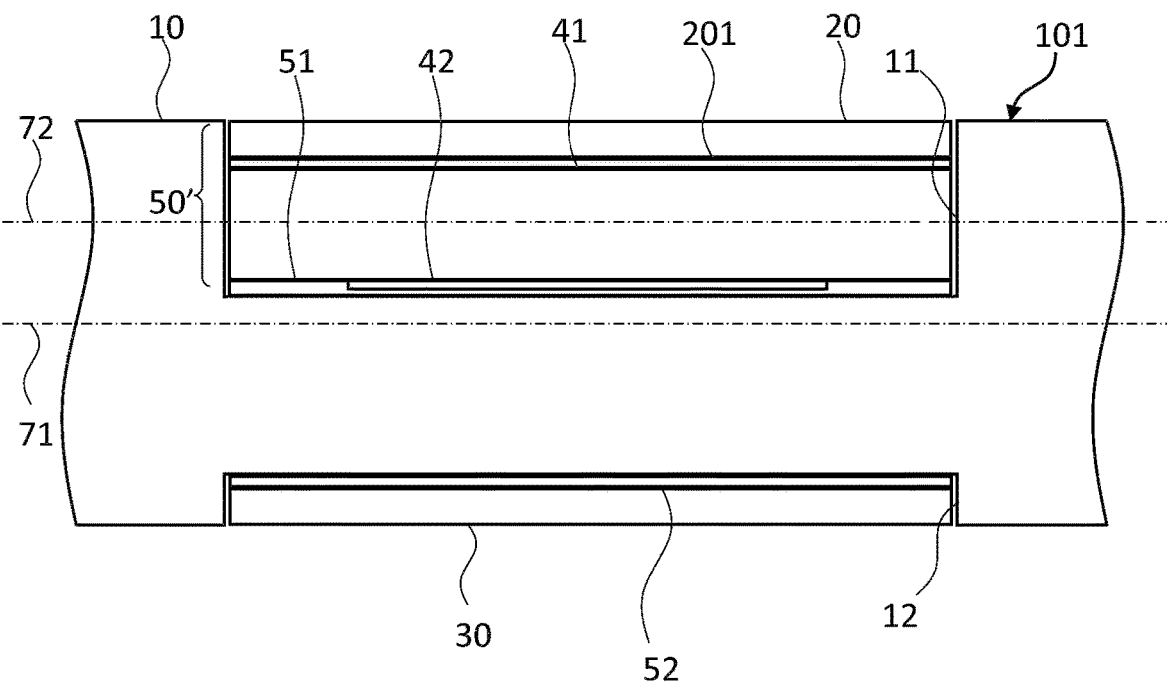
FIG. 5 shows a cross-sectional view of a portion of the cross-section of a game token in accordance with the second embodiment of the present invention.

FIG. 5 is a schematic cross-sectional view of a portion of the cross-section of a game token in the second embodiment of the present invention. In the second embodiment, a central part 20 having a print layer 201 on the lower surface and a plastic layer 41 are bonded with an adhesive, and an RFID tag 42 is disposed on the lower surface thereof to constitute a security part 50'. In other words, in this embodiment, the RFID tag 42 is provided on the inner surface of the security part 50'.

The central part 20 is transparent PETG, the thickness of which is 0.2 mm to 0.3 mm, or 0.25 mm in this embodiment. The plastic layer 41 is white PETG, and its thickness is 0.7 mm to 0.8 mm, or 0.76 mm in this embodiment. The RFID tag 42 is a printed RFID tag, and its thickness is 0.08 mm to 0.12 mm, or 0.1 mm in this embodiment. The security part 50 is 1.0 mm to 1.2 mm in total, and in this embodiment, it is 1.11 mm.

The thickness of the glue sheet 51 is about 0.075 mm. The depth of the deep recessed portion 11 that receives the security part 50' is 1.260 to 1.300 mm, and in this embodiment is 1.285 mm. Therefore, a security part 50' with a thickness of 1.11 mm is glued to this recessed portion 11 by a 0.075 mm glue sheet 51, so that the surface of the security part 50' and the surface of the receiving part 10 are almost flat, and the surface of the security part 50' is about 0.1 mm lower than the surface of the receiving part 10.

The depth of the recessed portion 11 that receives the security part 50' is about 38% of the thickness of the game token 100. In this way, the recessed portion 11 is sufficiently deep and in the security part 50 that is received therein, the RFID tag 42 is biased toward the center of the thickness direction of the game token 100, so that the position of the RFID tag 42 in the thickness direction of the game token 100 will be closer to the center of the thickness direction of the game token 100.

As described above, the amount of offset of the RFID tag 42 from the center of the thickness direction in the game token 101 should be small, and in this embodiment, the amount of offset is about 0.515 mm. This offset amount is about 15.4% of the thickness of the game token 100.

Figure 6:
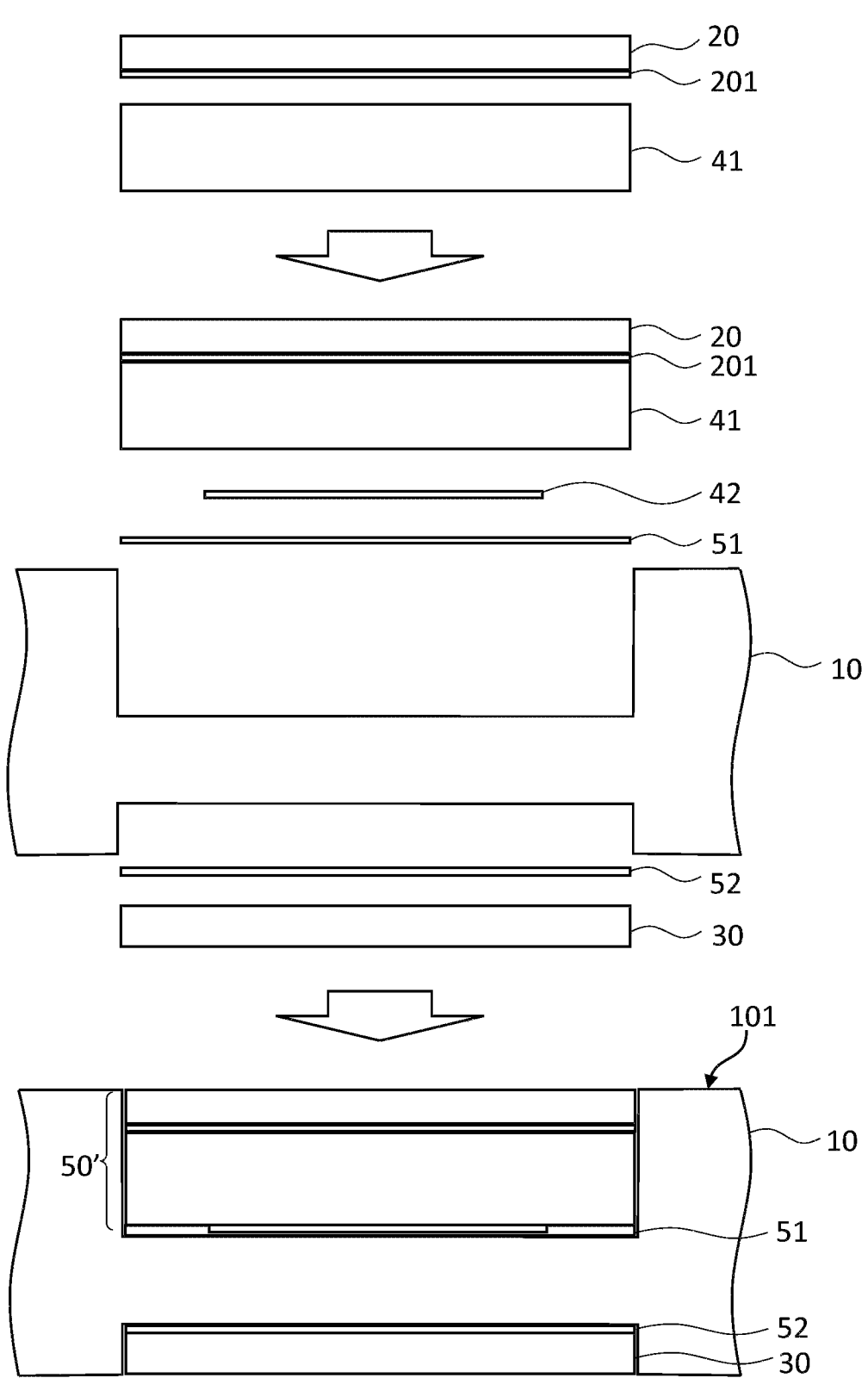
FIG. 6 shows a manufacturing process of a game token in accordance with the second embodiment of the present invention.

FIG. 6 shows the manufacturing process of a game token according to the second embodiment of the present invention. First, a central part 20 of transparent PETG having a print layer 201 on the lower (inner) surface and a plastic layer 41 of white PETG are glued together to form a laminated structure. The receiving part 10 is made by molding, and the glue sheet 51, the RFID tag 42, and the laminated structure are stacked in this order at the bottom of the deep recessed portion 11. The RFID tag 42 is placed between the glue sheet 51 and the laminated structure, and the laminated structure is glued to the top surface of the glue sheet 51 and fixed to the recessed portion 11. At this time, the security part 50 is composed of the laminated structure and the RFID tag 42 on its surface. The central part 30 is the same as in the first embodiment.

According to the second embodiment, the complicated process of thermo-compression bonding the plurality of plastic layers after sandwiching the RFID tag 42 between the plurality of plastic layers is unnecessary, and manufacturing is easy.

In this embodiment, the component corresponding to the plastic layer 41 may be generated by molding, or may be formed by stacking multiple plastic layers and thermo-compression bonding them.

In the above embodiment, a glue sheet 51, which is an adhesive, is provided between the RFID tag 42 and the bottom of the recessed portion 11. In addition to this, a glue sheet is also provided between the RFID tag 42 and the plastic layer 41 to encourage the RFID tag 42 to be destroyed when the security part 50' is removed from the recessed portion 11.

C. Third Embodiment

Figure 7:
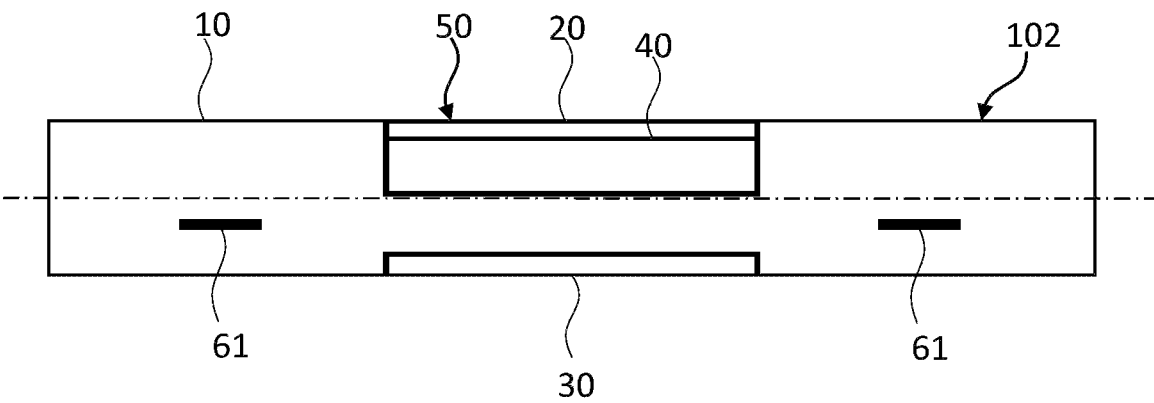
FIG. 7 shows a schematic diagram of a cross-section of a game token in accordance with a first example of the third embodiment of the present invention.

FIG. 7 is a schematic diagram showing a cross-section of a game token according to the first example of the third embodiment of the present invention. As described above, by making the recessed portion 11 of one surface of the game token deeper and placing the security part 50 therein, and by making the recessed portion 12 of the other surface shallower and placing the central part 30 therein, the game token is not balanced in the thickness direction in terms of the weight. In other words, if the specific gravity of the security part 50 is greater than that of the central part 30, the side on which the security part 50 is provided will be heavier.

Therefore, in the present embodiment, a weight member 61 is provided at a position deviating from the center in the thickness direction of the game token 102. The weight member 61 has a point-symmetrical shape with respect to the center of the surface of the game token 102. In this embodiment, the weight member 61 is provided on the side without the security part 50, rather than at the center of the thickness direction, to balance the weight of the game token 102 with respect to the center of the thickness direction. The specific gravity of the weight member 61 is greater than that of the receiving part 10. For example, the weight member 61 is made of a metal having a heavy specific gravity such as lead. The weight member 61 is circular in shape and is built into the outside of the recessed portions 11 and 12 of the receiving parts 10 by insert molding.

In this way, the weight member 61 balances the weight of the security part 50 side and the central part 30 side with respect to the center of the thickness direction in the game token 102. Even if the weight of the two sides is not completely equalized by the weight member 61, it is sufficient to alleviate the imbalance.

Figure 8:
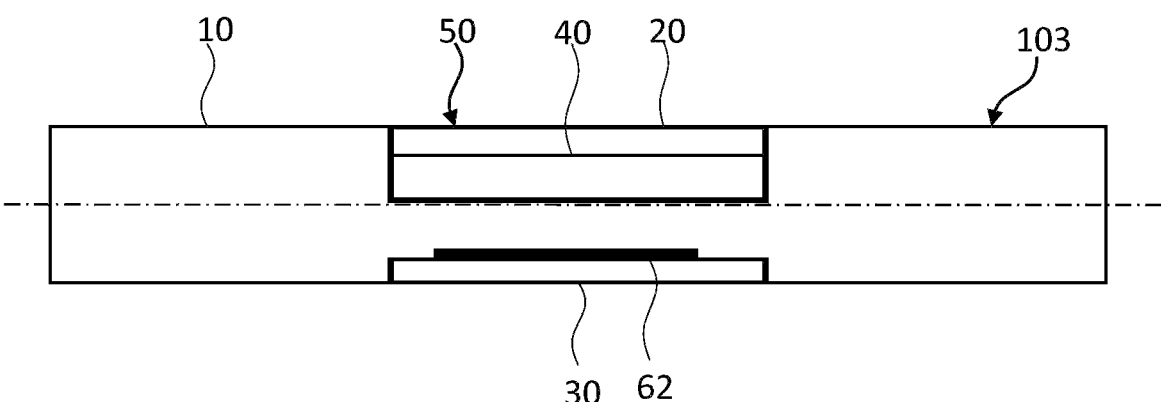
FIG. 8 shows a schematic diagram of a cross-section of a game token in accordance with a second example of the third embodiment of the present invention.

FIG. 8 is a schematic diagram showing a cross-section of the game token for the second example of the third embodiment of the present invention. In the game token 103 in this example, a weight member 62 is embedded in the center of the bottom of the recessed portion 12 that receives the central part 30. The specific gravity of the weight member 62 is greater than the specific gravity of the receiving part 10. This example also eliminates or alleviates the imbalance in the weight of the game token 103 due to the installation of the security part 50.

In the case where the side with the security part 50 is lighter than the side with the security part 30 due to the size relationship of the specific gravity of the security part 50, the central part 30, and the receiving part 10, the weight member is placed on the side with the security part 50 to eliminate or alleviate the weight imbalance.

As described above, in the game token in the embodiments of the present invention, the receiving part 10 has a shallow depth recessed portion 12 on one side and a recessed portion 11 which is deeper than the recessed portion 12 on the other side. The central part 30 is fitted into the recessed portion 12 and the security part 50 is fitted into the recessed portion 11. As a result, the RFID tag 42 of the security part 50 is placed in the recessed portion 11, deeper than the depth of the recessed portion 12. Since the security part 50 having the RFID tag 42 is inserted into the deep depression 11, the offset amount, which is the bias of the RFID tag 42 from the center of the thickness direction of the game token, can be reduced compared to the conventional method.

In particular, in the first embodiment, since the RFID tag 42 is received in the receiving part 10 with the RFID tag 42 built into the laminated structure 40 in advance, RFID tag 42 can be prevented from failing in which the RFID tag 42 is subjected to stress or the RFID tag 42 is rubbed to be destroyed.

In the above embodiment, the weight member is disposed at a position deviating from the center of the thickness direction of the game token, but in addition to or instead of this, the weight member may have an asymmetrical shape in the thickness direction of the game token. The weight member having an asymmetrical shape in the direction of the thickness of the game token may be arranged to straddle the center of the game token.

In the above embodiment, one security part is provided for one game token, but a plurality of security parts may be provided for one game token. In this case, one security part may be provided on one side of the surface and another security part on the other side of the surface. By setting both of the offset amounts of RFID tags in the two security parts to be 25%, the distance between adjacent RFID tags can be uniformly set to 50% of the thickness of the game token when the plurality of game token are stacked in any orientation.

In the above embodiment, the central parts 20 and 30 are made of transparent PETG and printed on the inner surface thereof, but stickers may be used in place of the central parts 20 and 30. In this case, each recessed portion 11, 12 in the above embodiment may be formed shallowly by the amount equivalent to the difference in thickness between the central parts 20, 30 and the sticker. Alternatively, there may be no recessed portion on the opposite side of the recessed portion 11 that receives the security parts. In addition, the central part 20 in the above embodiment may be omitted and printing may be performed on the surface of the plastic layer 41.

EXPLANATIONS OF THE REFERENCE NUMERALS

10 Receiving part
11, 12 Recessed portions
20, 30 Central part
201, 203 Print layer
40 Laminated structure
41, 43 Plastic layer
42 RFID tag
50 Security part
51, 52 Glue sheet
61, 62 Weight member
100-103 Game token

The invention claimed is:

1. A game token comprising:
a security part; and
a receiving part that accepts the security part,
wherein the security part has:
    a shape with a diameter smaller than the diameter of the receiving part,
    a structure comprising a plurality of laminated plastic layers,
    an RFID tag,
    a visible print layer indicating a type or an ID of the game token, and
    a decal that includes the visible print layer,
wherein the receiving part has a recessed portion on its surface to accept the security part, and the depth of the recessed portion is at least 25% of the thickness of the game token, and
wherein the decal is fitted into the recessed portion.

2. The game token according to claim 1, wherein the RFID tag is positioned less than 25% above and below the center of the thickness direction of the game token.

3. The game token according to claim 1, wherein the RFID tag is disposed between the plurality of plastic layers.

4. The game token according to claim 1, wherein the RFID tag is provided on the inner surface of the security part.

5. The game token according to claim 1, wherein the RFID tag stores information related to the type or the ID of the game token represented in the visible print layer.

6. The game token according to claim 1, wherein the RFID tag stores information associated with the appearance of the receiving part.

7. The game token according to claim 1, wherein the security part comprises a thermo-compression bonded plastic layer.

8. The game token according to claim 1, wherein the security part is composed of a plastic layer bonded with an adhesive.

9. A game token comprising:
a receiving part having a recessed portion on at least one side; and
a security part having an RFID tag and a decal that indicates a type or an ID of the game token, wherein the security part is inserted into the recessed portion,
wherein the depth of the recessed portion is 25% or more of the thickness of the receiving part, wherein the RFID tag is positioned within 25% of the
radius above or below the center of the thickness
direction of the game token, and wherein the decal is fitted into the recessed portion.

10. A game token comprising:

a receiving part having a recessed portion on at least one
side; and a security part that is inserted into the recessed portion, wherein the security part has:

a laminated structure including a plurality of plastic
layers, and a decal indicating a type or an ID of the game token, wherein an RFID tag is embedded between the plastic
layers, and wherein the decal is fitted into the recessed portion.

* * * * *